US009453976B2

(12) United States Patent
Qian et al.

(10) Patent No.: US 9,453,976 B2
(45) Date of Patent: Sep. 27, 2016

(54) OPTICAL CONNECTOR

(71) Applicant: APPLE INC., Cupertino, CA (US)

(72) Inventors: Amy Qian, Sunnyvale, CA (US); Derek W. Wright, San Francisco, CA (US); John Raff, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 14/597,995

(22) Filed: Jan. 15, 2015

(65) Prior Publication Data

US 2016/0091678 A1    Mar. 31, 2016

Related U.S. Application Data

(60) Provisional application No. 62/057,759, filed on Sep. 30, 2014.

(51) Int. Cl.
*H04B 10/00* (2013.01)
*G02B 6/42* (2006.01)
*H04B 10/80* (2013.01)

(52) U.S. Cl.
CPC .......... *G02B 6/4206* (2013.01); *G02B 6/4292* (2013.01); *G02B 6/4295* (2013.01); *H04B 10/801* (2013.01)

(58) Field of Classification Search
CPC  G02B 6/4206; G02B 6/4292; G02B 6/4295; H04B 10/801
See application file for complete search history.

(56) References Cited

U.S. PATENT DOCUMENTS

| 5,903,369 | A | * | 5/1999 | Hirayama | ............ | H04B 10/114 |
| | | | | | | 398/118 |
| 6,081,356 | A | * | 6/2000 | Branc | ................ | H04B 10/114 |
| | | | | | | 398/1 |
| 2002/0071161 | A1 | * | 6/2002 | Perkins | ..................... | G01S 1/70 |
| | | | | | | 398/118 |
| 2003/0043025 | A1 | * | 3/2003 | Inoue | ................... | H04B 10/114 |
| | | | | | | 340/286.01 |
| 2004/0171369 | A1 | * | 9/2004 | Little | ................... | G06Q 10/107 |
| | | | | | | 455/410 |
| 2009/0208221 | A1 | * | 8/2009 | Sasai | ..................... | H04B 1/707 |
| | | | | | | 398/130 |
| 2010/0227642 | A1 | * | 9/2010 | Kim | .................. | H04M 1/72575 |
| | | | | | | 455/556.1 |
| 2012/0106041 | A1 | * | 5/2012 | Ashida | .................... | A63F 13/06 |
| | | | | | | 361/679.01 |
| 2013/0242479 | A1 | * | 9/2013 | Yoo | ..................... | H05K 5/0017 |
| | | | | | | 361/679.01 |
| 2014/0191682 | A1 | * | 7/2014 | Pederson | ........... | H04B 10/1143 |
| | | | | | | 315/294 |
| 2014/0199078 | A1 | * | 7/2014 | Lim | ..................... | H04B 10/116 |
| | | | | | | 398/103 |
| 2016/0091678 | A1 | * | 3/2016 | Qian | .................... | G02B 6/4206 |
| | | | | | | 398/142 |

\* cited by examiner

*Primary Examiner* — Danny Leung
(74) *Attorney, Agent, or Firm* — Kilpatrick Townsend & Stockton LLP (57) ABSTRACT

An electronic device having an optical connector that provides and/or receives optical signals through openings or perforations formed at an external surface of the electronic device. These openings can serve as the interface of the optical connector through which the electronic device can engage in one-way or two-way communication with corresponding optical connectors of other electronic devices. These openings can be sized such that they are not visible or not easily visible with the naked human eye. As such, these openings can be too small for communicating with corresponding optical connectors using any single one of these openings. But light that is collectively transmitted through or received through a group of these openings can provide optical signals that can be used to communicate with corresponding optical connectors using optical signals.

20 Claims, 6 Drawing Sheets

OPTICAL CONNECTOR

CROSS REFERENCE TO RELATED APPLICATIONS

The present application claims the benefit of U.S. Provisional Application No. 62/057,759, filed Sep. 30, 2014, which is hereby incorporated by reference for all purposes.

FIELD

The present invention relates generally to input/output electrical connectors, and in particular optical connectors for electronic devices.

BACKGROUND

Many electronic devices include electrical connectors that receive and/or provide data. These electrical connectors are typically receptacle connectors and are designed to receive a single male plug connector extending from a cable, thereby forming one or more conductive paths for signals. The cable may also be attached to power adapters, accessories, devices or other connectors (e.g., plug or receptacle connectors), thereby allowing signals to be exchanged via the cable.

As the cosmetic appearance and convenience of electronic devices continue to become more important, devices are increasingly leveraging wireless signal transfer to obviate the need for physical connectors for communication between devices. However, the use of certain forms of wireless communication creates a number of challenges. For example, Bluetooth, one form of wireless communication used for communication between devices, can consume a significant amount of power. On the other hand, optical communication between devices may require less power, but conventional optical connector interfaces are visible and may detract from the overall cosmetic appearance of a device.

Current electronic devices, portable and otherwise, may suffer from some or all of these deficiencies or from similar deficiencies.

SUMMARY

Various embodiments of the present invention pertain to an optical connector for an electronic device that improves upon some or all of the above described deficiencies. For example, an optical connector can include an interface at an external surface of a device having a plurality of non-visible openings, instead of a light-permeable window, through which optical signals can pass. As such, optical signals can still be transmitted and received through the plurality of openings of this interface, but the connector interface may not be visible, thereby allowing the cosmetic appearance of the device to be unaffected by the optical connector interface. This optical connector can also enable devices to communicate with other devices, including peripherals, while consuming less power than would be consumed by Bluetooth communication between devices.

According to one embodiment, an electronic device that supports optical communication is provided. The electronic device can include a connector having a mating region that includes a plurality of openings, the mating region forming a portion of an exterior surface of the electronic device. The connector can include an active optical component for at least one of transmitting or receiving optical signals, the active optical component positioned adjacent to the plurality of openings, wherein each of the plurality of openings can be sized such that an amount of light passing through any single opening of the plurality of openings is insufficient for communicating with a corresponding connector using an optical signal. The electronic device can also include a lens positioned between the plurality of openings and the active optical component.

According to another embodiment, an electronic device that supports optical communication is provided. The electronic device can include a housing having a mating region that includes an optical channel having a plurality of openings extending between exterior and interior surfaces of the housing. The electronic device can also include a processor positioned within the housing. The electronic device can further include an optical connector positioned adjacent to the mating region, the optical connector including an active optical component operatively coupled to the processor and a lens positioned between the optical channel and the active optical component, wherein the optical component is configured to transmit and receive optical signals between the electronic device and a corresponding optical connector associated with a second device through the optical channel, and wherein each individual opening in the plurality of openings is too small to allow an optical signal to be communicated over the optical channel through the individual opening.

According to yet another embodiment, the invention pertains to a method for initiating optical communication between an optical connector of an electronic device and a corresponding connector of another electronic device. An active optical component of the optical connector can be activated when an event is detected by the electronic device. Optical signals can be at least one of transmitted or received using the active optical component, wherein the active optical component is positioned adjacent to a plurality of openings of the optical connector, wherein each of the plurality of openings is sized such that an amount of light passing through any single opening of the plurality of openings is insufficient for communicating with the corresponding connector using an optical signal.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION

The present invention will now be described in detail with reference to certain embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known details have not been described in detail in order not to unnecessarily obscure the present invention.

Embodiments of the present invention provide an electronic device having an optical connector that provides and/or receives optical signals (e.g., signals conforming to Infrared Data Association (irDA) protocols or Consumer IR protocols) through small openings or perforations formed at an external surface of the electronic device. These perforations can serve as the interface of the optical connector, through which the electronic device can engage in one-way or two-way communication with corresponding optical connectors of other electronic devices. The perforations can be sized such that they are not visible or not easily visible with the naked human eye. As such, these perforations can be too small for communicating with corresponding optical connectors using any single one of these perforations. But light that is collectively transmitted through or received through a group of these perforations can provide optical signals that can be used to communicate with corresponding optical connectors. The corresponding optical connectors can be conventional optical connectors or another optical connector according to the present invention.

Electronic devices according to the present invention can also include power contacts (e.g., flush pins or electrical contacts) and/or inductive charging elements at the optical connector interface to charge the electronic device, e.g., to offset power consumed while engaging in optical communication using an optical connector according to the present invention. Additionally, optical connectors according to the present invention can conserve power and potentially obviate the need for power contacts or inductive charging elements by periodically powering on the optical connector, powering on the optical connector when an input corresponding to a command to engage in optical communication is received at the electronic device, or by attempting to engage in optical communication when sensors determine that the optical connector is proximate or physically coupled to a corresponding connector.

As used herein the terms "electronic device" or "device" may refer to any device that uses electrical power to operate. In some instances, embodiments of the invention are particularly well suited for use with portable electronic media devices because of their small form factor. Such devices may include, for example, portable music players (e.g., MP3 devices and Apple's iPod devices), portable video players (e.g., portable DVD players), cellular telephones (e.g., smart telephones such as Apple's iPhone devices), wearable devices such as smartwatches, video cameras, digital still cameras, projection systems (e.g., holographic projection systems), gaming systems, PDAs, desktop computers, as well as tablet (e.g., Apple's iPad devices), laptop or other mobile computers. Other examples of electronic devices include accessory devices such as smart covers, docking stations, cable assemblies, chargers, external power sources such as external batteries, cable adapters, clock radios, game controllers, audio equipment, headsets or earphones, video equipment and adapters, keyboards, medical sensor devices such as heart rate monitors and blood pressure monitors, point of sale (POS) terminals, as well as numerous other hardware devices that can connect to and exchange data with a host device.

Figure 1:
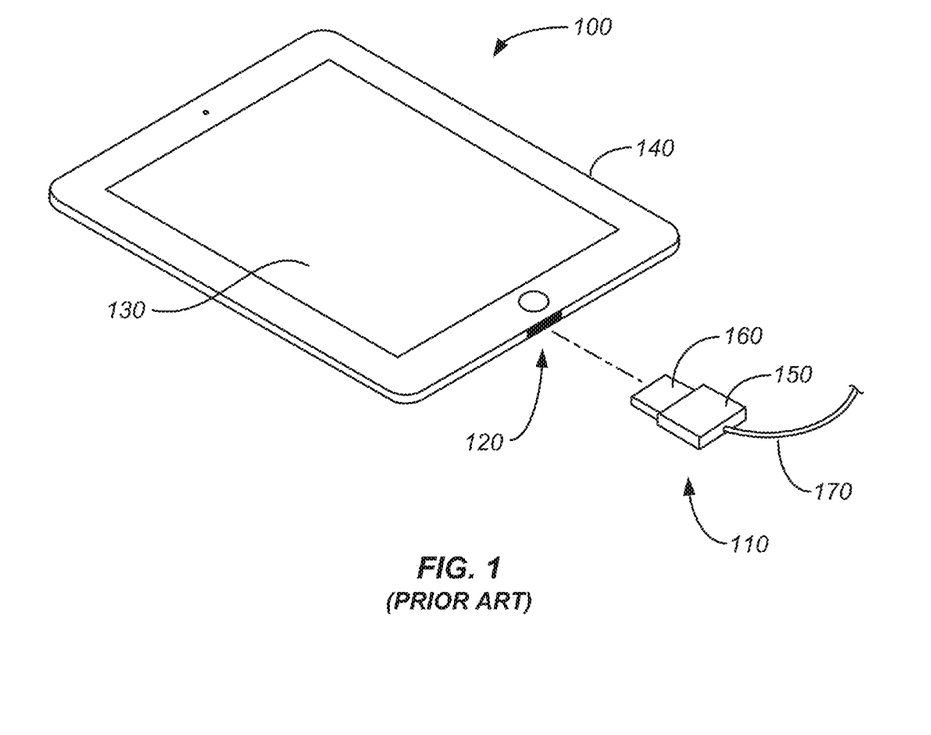
FIG. 1 illustrates a simplified perspective view of one particular electronic device and a plug connector that can be mated with a corresponding receptacle connector of the device.

FIG. 1 illustrates a simplified perspective view of one particular electronic device 100 and a plug connector 110 that can be mated with a corresponding receptacle connector 120 of device 100. Device 100 includes a touch screen display 130 as both an input and an output component housed within a device housing 140. Receptacle connectors 120 can be positioned within housing 140 such that the cavity of the receptacle connector into which corresponding plug connector 110 is inserted can be located at an exterior surface of device housing 140. The cavity can open to an exterior side surface of device housing 140. For simplicity, various internal components, such as the control circuitry, graphics circuitry, bus, memory, storage device and other components are not shown in FIG. 1.

As shown in FIG. 1, plug connector 110 includes a body 150 and a tab or insertion end 160 that extends longitudinally away from body 150 in a direction parallel to the length of the connector. A cable 170 is attached to body 150 at an end opposite of insertion end 160. Insertion end 160 is sized to be inserted into corresponding receptacle connector 120 during a mating event and may include contacts (not shown) formed on exterior surfaces of insertion end 160. When insertion end 160 is inserted into corresponding receptacle connector 120, exterior surfaces of insertion end 160 abut a housing of receptacle connector 120 of device 100. The contacts of connector 110 (not shown) can be used to carry a wide variety of signals including digital signals and analog signals as well as power and ground.

As illustrated and described above with reference to FIG. 1, a traditional wired connector interface can include numerous visible features on the receptacle connector side to accommodate wired charging, e.g., a receptacle connector cavity. These visible features can adversely affect the cosmetic appearance of electronic devices that include a traditional wired connector interface such as receptacle connector 120. However, the present invention can, among other things, provide an electronic device with an optical connector that may not affect the cosmetic appearance of the electronic device and can consume less power than that of conventional Bluetooth or other wireless, non-visible communication interfaces. The following figures illustrate examples of electronic devices having such an optical connector.

Figure 2A:
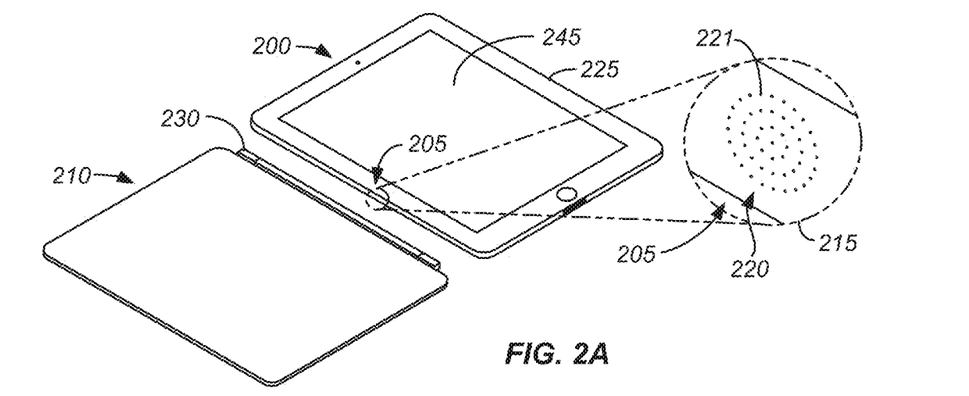
FIGS. 2A-2C illustrates perspective views of an electronic device that includes an optical connector for communicating with another electronic device, according to an embodiment of the present invention.
Figure 2B:
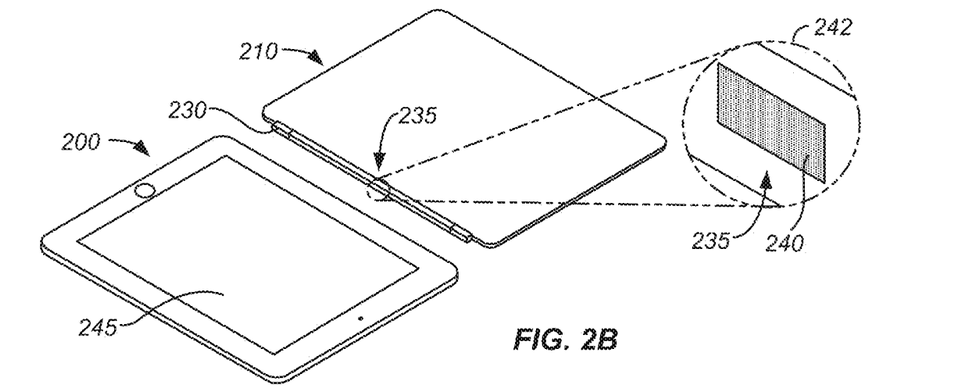
Figure 2C:
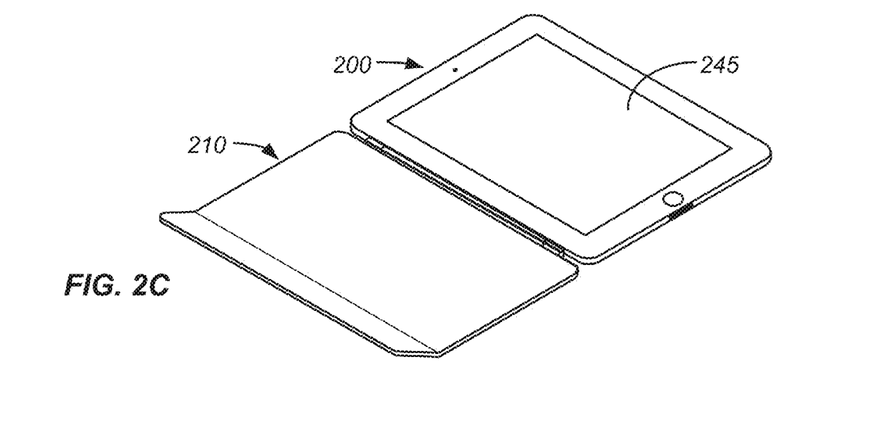

FIGS. 2A-2C illustrates perspective views of an electronic device 200 that includes an optical connector 205 for communicating with an electronic device 210, according to an embodiment of the present invention. As shown in FIG. 2A, electronic device 200 (e.g., a tablet) can include optical connector 205 that can be used for communicating with electronic devices such as device 210 (e.g., a smart cover). Examples of the internal components of optical connector 205 are discussed below with reference to FIGS. 3A-5B. As shown in close up view 215, optical connector 205 can include a number of perforations or openings 220, which can be located at a region, i.e., a mating region, of device housing 225 that interfaces with, or is proximate to, corresponding connectors (e.g., connector 235, as shown in FIG. 2B) during mating events (e.g., when device 200 is mated with device 210, as shown in FIG. 2C). Collectively, openings 220 form an optical channel that can replace light permeable windows (e.g., window 240, as shown in FIG. 2B) used by traditional optical connectors (e.g., optical connector 335, as shown in FIG. 2B).

Openings 220 can be sized such that they are not visible or not easily visible by the naked human eye. Openings 220 can be so small that no single opening of openings 220 is large enough for carrying optical signals to and/or from a corresponding optical connector (e.g., connector 235, as shown in FIG. 2B). However, openings 220 can be large enough so that the collective light that can pass through individual openings (e.g., openings 221) of openings 220 can still be sufficient for optical signal communication. For example, the diameter of an individual opening (e.g., opening 221) of openings 220 can range between, e.g., about 0.01 millimeters (mm) and about 0.4 mm (e.g., 0.22 mm or 0.03 mm), and the number of openings included with openings 220 can range between, e.g., about 5 openings and about 100 openings (e.g., 8 openings or 19 openings). The size of the individual openings of openings 220 and the number of openings of openings 220 can have a negative correlation so that, e.g., larger openings can compensate for optical signal losses when there are fewer openings and vice versa. In addition, surface finishing can be applied to housing 225 to help mask or camouflage openings 220, thereby allowing the size of individual openings of 220 to be larger while still being not visible or not easily visible by the naked human eye.

Optical connector 205 can also include magnetic elements (not shown) for magnetically attracting magnetic elements (not shown) of corresponding optical connector 235 (as shown in FIG. 2B), a hinge 230, or device 210. This magnetic attraction between magnetic elements of optical connector 205 and corresponding magnetic elements can assist in aligning and mating optical connector 205 with corresponding optical connectors when these connectors are proximate each other. Proper alignment and mating of optical connector 205 with respect to corresponding optical connectors can center or focus light transmitted during optical communication about the center of either optical connectors 205 or optical connectors 235, depending on whether optical connector 205 is transmitting or receiving the optical signals. This can maximize or increase the signal strength of the optical signals received or transmitted by optical connector 205, thereby decreasing or minimizing optical signal losses. Mechanical latching or interference fits could also be used to align and/or retain the mating of optical connectors 205, 235.

As shown in close up view 242 of FIG. 2B, which is a 180 degree rotated view of FIG. 2A, electronic device 210 includes an optical connector 235 having a light permeable window 240 positioned on hinge 230. Window 240 can be made from a material permeable to the specific wavelength of optical signals used by optical connectors 205, 235. For example, permeable window 240 can be made from polymers such as acrylic, which are permeable to infrared light.

Optical connector 235 can be positioned such that optical connector 235 is aligned with optical connector 205 when devices 200, 210 are mated, as shown in FIG. 2C. Optical connector 235 can also be configured to communicate with optical connector 205 when devices 200, 210 are not physically mated, but rather just proximate each other (e.g., spaced as shown in FIGS. 2A and 2B or spaced apart by a greater distance).

A number of different types of information, commands, state information, and other inputs/outputs can be communicated between devices 200, 210 using optical connectors 220, 235. For example, device 210 can communicate information to identify itself and/or provide information about its features, thereby allowing device 200 to access those features to, e.g., allow its applications to provide additional functionality corresponding to the identified features of device. Where device 210 includes a keyboard, a user could provide text input to an application running on device 200 by providing input at the keyboard (e.g., keystroke inputs), which input can be communicated to the application via optical control signals using optical connectors 220, 235. Further examples and discussion of types of other inputs that can be communicated between devices such a tablets and smart covers, which could also be communicated using optical connector 205, can be found in commonly owned and co-pending U.S. application Ser. No. 13/708,833, filed Dec. 7, 2012, and titled "INTEGRATED VISUAL NOTIFICATION SYSTEM IN AN ACCESSORY DEVICE," the content of which is incorporated by reference herein in its entirety for all purposes.

In order to conserve power, optical connector 205 can remain powered off except for when it is physically coupled or proximate to a corresponding connector (e.g., connector 235). For example, optical connector 205 and/or device 200 can include sensors (not shown in FIGS. 2A-2C) for determining the presence of a corresponding connector. For example, connector 205 can include magnetic, optical, electrical and/or other sensors for determining the presence of corresponding connectors. Further examples and discussion suitable sensors and methods for using sensors to determine the presence of a corresponding connector can be found in commonly-owned U.S. Pat. No. 8,556,659 for "RECEPTACLE CONNECTOR WITH CIRCUITRY FOR DETERMINING THE CONFIGURATION OF A CORRESPONDING PLUG CONNECTOR MATED THEREWITH," filed Apr. 9, 2012, which is hereby incorporated by reference in its entirety for all purposes.

As an alternative to sensors, optical connector 205 could periodically (e.g., every 20 seconds or every 5 minutes) turn on, activate its internal components, and attempt to establish communication with corresponding device 210 via transmitting and/or receiving optical signals and turn off if communication cannot be established or if an established optical communication link is not being actively used. As another example, optical connector 205 could simply remain powered off until input corresponding to instructions to power on are received at device 200. For example, device 200 can be configured to receive power-on instructions for optical connector 205 at a touch screen display 245 of device 200.

Although device 200 is shown and described as including openings 220, which includes circular openings, embodiments of the invention could also implement openings for openings 220 that are otherwise shaped. For example, shapes composed of straight lines such as polygonal shapes, shapes composed of curved lines, irregular shapes, and other shapes could be used. In addition, openings 220 can be arranged in a pattern other than of openings 220, as shown in close up view 215. For example, instead of being arranged in concentric rings surrounding a single opening positioned in the center of the rings, as shown in FIG. 2A, the openings could be, e.g., arranged in parallel lines or in rings that are shaped liked the shapes listed above. As yet another example, the opening can be arranged in a random pattern of equally spaced openings or unequally spaced openings. The opening of openings 220 can also span a larger or smaller surface area than that of openings 220.

It will also be appreciated that optical connector 205 can be located at other positions on housing 225 (e.g., a different side of housing 225) or in multiple locations (e.g., device 200 can include more than one optical connector 205). Optical connector 205 can even be positioned on an accessory device (e.g., a device 210) instead of, or in addition to, a host device (e.g., a device 200). Where an accessory device such as device 210 includes optical connector 205, a corresponding host device such as device 205 can also include optical connector 205 or a corresponding traditional optical connector (e.g., connector 235).

Additionally, another embodiment of optical connector 205 can include two sets or more of openings 220, each having its own set of internal components (e.g., active and passive optical components), shared common internal components or a combination thereof. For example, an embodiment of optical connector 205 can include one set of openings 220 for transmitting optical signals while another set of openings 220 that are also part of connector 205 can be used to receive optical signals. Alternatively, optical connector 205 can include multiple sets of openings 220 for transmitting the same or different optical signals and/or multiple sets of openings 220 that can be used for receiving the same or different optical signals. To further expand the function of optical connector 205, optical connector 205 of electronic device 200 can include multiplexing/demultiplexing circuitry. This circuitry can receive/send certain signals at one point in time and then send other signals at a different point in time. Thus, instead of having openings 220 dedicated to a particular type of signal (e.g., identification, input or others), openings 220 and associated circuitry (e.g., active optical component 320, as shown in FIG. 3) or pair of openings 220 can transmit a number of different types of signals.

As mentioned above, the internal components of optical connector 205 are discussed in further detail herein; the following figures illustrate examples of optical connectors and their internal components.

Figure 3:
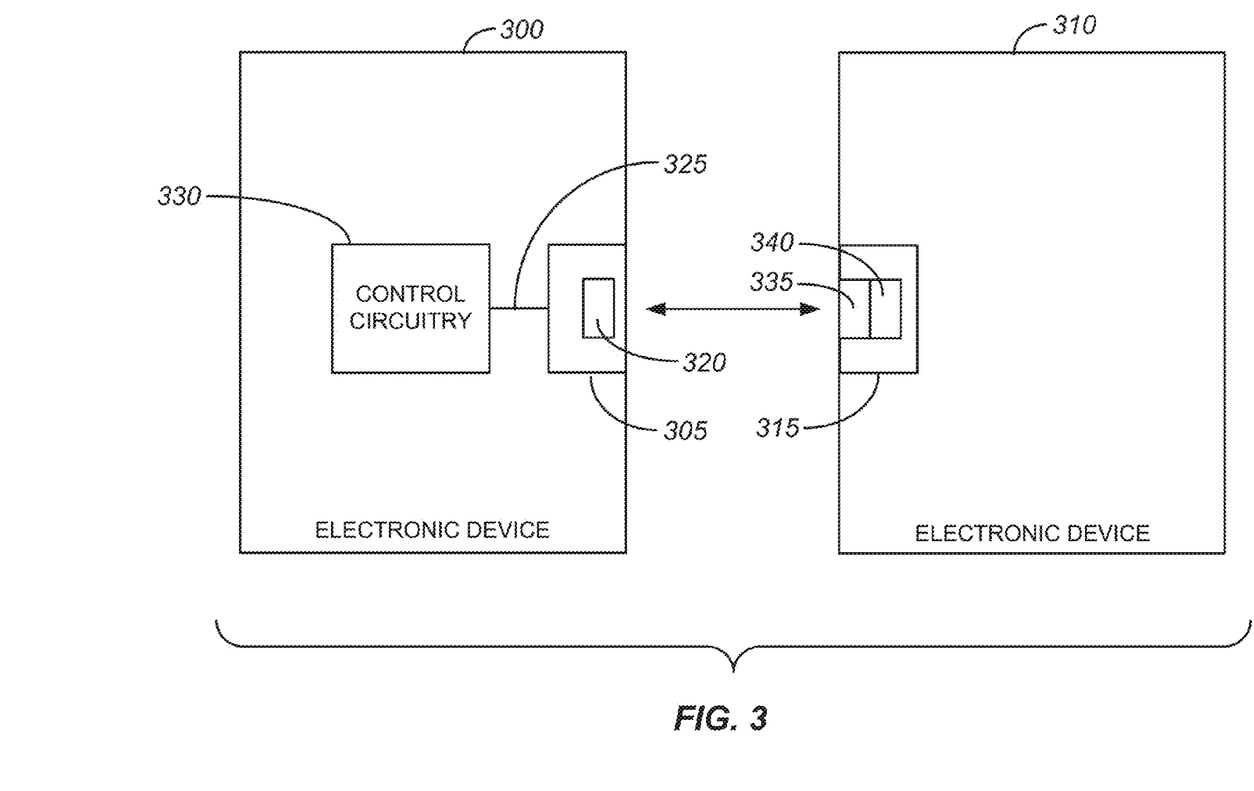
FIG. 3 is a block diagram illustrating an electronic device that includes an optical connector for communicating with another electronic device, according to an embodiment of the present invention.

FIG. 3 is a block diagram illustrating an electronic device 300 that includes an optical connector 305 for communicating with an electronic device 310, according to an embodiment of the present invention. Electronic devices 300, 310 can be any of the electronic devices discussed herein including devices 200, 210 (shown in FIGS. 2A-2C), with electronic device 310 including a traditional optical connector 315 (e.g., optical connector 235, as shown in FIG. 2B) and electronic device 300 including an optical connector (e.g., optical connector 205, as shown in FIG. 2A) according to the present invention. Devices 300, 310 can also include various internal components, such as the input and output controllers, graphics circuitry, bus, memory, storage device and other components, which, for simplicity, are not shown in FIG. 3.

Optical connector 305 includes an active optical component 320 that can convert electric signals from electronic device 300 into optical signals and/or convert optical signal received from another device (e.g., device 310) into electrical signals that are usable by electronic device 300. Active optical component 320 can be an optical transmitter, an optical receiver, or an optical transceiver that includes both an optical transmitter and an optical receiver. Optical connector 305 can include any number of active optical components, including lens devices (e.g., lens device 418 and transmission lens 518, as shown in FIGS. 4A-B and FIGS. 5A-5B, respectively) for transferring light to active optical component 320 (or active optical component 320 may include such lens devices). In one embodiment, active optical component 320 can be configured to work with electromagnetic radiation at a specific wavelength (e.g., 650 nm or 850 nm) or any wavelength suitable for optical communication. In another embodiment, optical connector 305 has two separate active optical components, one for transmitting and one for receiving.

An electrical conductor 325 can travel from a control circuitry 330, which can control the performance of device 300 and can include a processor, to connector 305. Electrical conductor 325, which can include more than one conductor, can carry electrical signals to be converted by active optical component 320, or receive electrical signals that result from optical signals being converted to electrical signals by active optical component 320. Thus, in one aspect, electronic device 300 (e.g., through control circuitry 330) can receive electrical signals in a same manner as for a purely electrical connector. Accordingly, some internal components of electronic device 300 can be built the same for electrical or optical connectors.

Optical connector 305 can receive signals from traditional optical connector 315 of device 310. Optical connector 315 can include a passive optical device 335 that can receive optical signals or carry optical signals to active optical component 320 or to a lens device of connector 305 that is optically coupled with active optical component 320. This passive optical device 335 is passive in that the optical signals are not converted to/from electrical form, but stay in optical form while being carried. Optical connector 315 also includes an active optical device 340 that is optically coupled with the passive optical device 335 and can convert optical signals to/from electrical form in order to communicate with optical connector 305.

In an embodiment where device 300 includes a single active optical component (e.g., active optical component 320), the active optical component can be a transceiver. In this embodiment, different optical frequencies (e.g., wavelength of 850 nm in one direction and 1350 nm in the other) can be used. Filters or other mechanisms can be used to reduce optical cross talk, e.g., by blocking light from the transmitting component to the receiving component.

While the figures and description above are directed to an optical connector having an active optical component 320 that could be an optical transmitter, an optical receiver, or even optical transceiver, the following figures illustrate examples of optical connectors that specifically include an active optical component that is an optical receiver—female optical connectors—or an active optical component 320 that is an optical transmitter—male optical connectors.

Figure 4A:
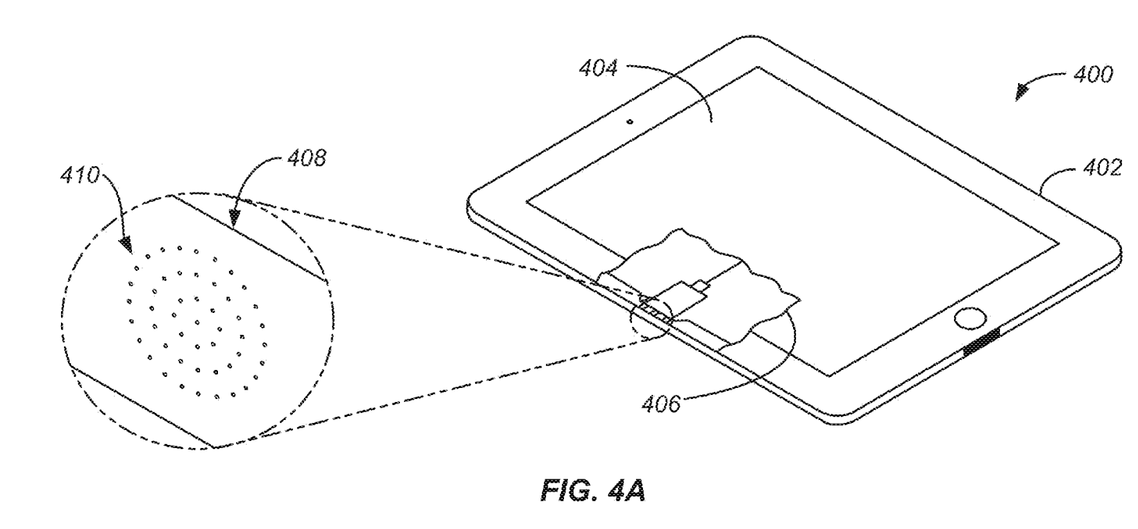
FIG. 4A is a perspective view of an electronic device with a housing and a display partially cut away to reveal a simplified, partial section view of a female optical connector, according to an embodiment of the present invention.
Figure 4B:
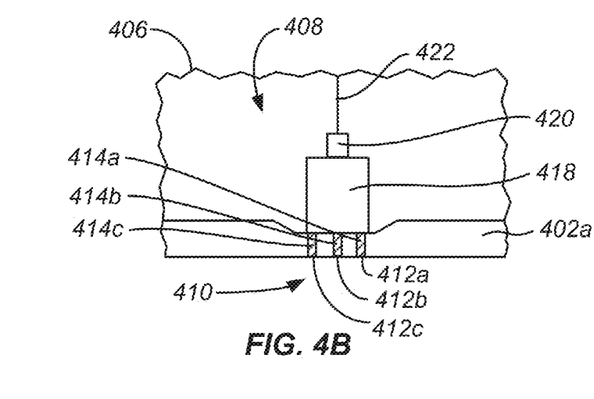
FIG. 4B is an enlarged view of the simplified, partial section view of FIG. 4A.

FIG. 4A is a perspective view of an electronic device 400 with a housing 402 and a display 404 partially cut away to reveal a simplified, partial section view 406 of a female optical connector 408, according to an embodiment of the present invention. FIG. 4B is an enlarged view of the simplified, partial section view 406 of female optical connector 408 of FIG. 4A. Note that the elements of FIGS. 4A-4B are not drawn to any particular scale or even the same scale. Female optical connector 408 can be similar to optical connector 205 (shown in FIG. 2A), except that optical connector 408 is specifically a female connector. Accordingly, the description above related to device 200 (shown in FIG. 2A) and the external features of optical connector 205 (shown in FIG. 2A) and variations thereof may also be applied to device 400 and female optical connector 408 and thus are not repeated here in their entirety in the interest of brevity. For example, like optical connector 205, female optical connector 408 also includes openings—openings 410—that form an optical channel for carrying optical signals.

As shown in section view 406 at FIG. 4B, openings 410 includes individual openings 412a, 412b, 412c (not all individual openings of openings 410 are shown in FIG. 4B) for receiving optical signals from a corresponding optical connector (e.g., optical connector 235 or even optical connector 205, as shown in FIGS. 2A-2C). Again, the description of openings 221 and variations thereof may apply to openings 412a, 412b, 412c and are not repeated here in their entirety in the interest of brevity. Some or all of openings 410 can also be partially or wholly filled, e.g., using insert molding, with a passive optical component for carrying optical signals. For example, as shown in FIG. 4B, openings 412a, 412b, 412c can be filled with passive optical components 414a, 414b, 414c, respectively, which can be made from, e.g., optical fiber such as glass or plastic fiber. Alternatively, a thin film or a coating can be used to cover openings 410 to simply prevent ingress of debris at openings 410. However, in some embodiments, the individual openings of openings 410 are not filled with any kind of passive optical component.

Female optical connector 408 can include receiving lens device 418 that receives optical signals from a corresponding optical connector via openings 410. Lens device 418 can include a lens that is attached to or part of a collector (e.g. a parabolic concentrator), which collects the light received via openings 410 and provides the light to a photodiode 420 or another optical receiver. This collector can have a large opening that faces openings 410 and a small opening that faces photodiode 420. In this manner, the light of optical signals can be delivered to an active area of photodiode 420 through the small opening, which can allow photodiode 420 to be small, thus reducing its capacitance. Thus, light can be collected at a larger diameter and delivered at a smaller diameter. As such, more light can be provided to photodiode 420 than if the diameter of lens device 418 was constant about its length.

As mentioned above, device 400 and/or optical connector 408 can include magnetic elements or other mechanical elements to reduce misalignment between optical connector 408 and corresponding optical connectors, but some misalignment can still occur. Accordingly, the surface area of the lens of lens device 418 may be sized to be at least as large, if not significantly larger, than as the surface area spanned by openings 410 (e.g., 0.1 mm$^2$ or 2.0 mm$^2$), thereby accommodating for some misalignment between optical connector 408 and a corresponding connector.

Photodiode 420 can create electrical signals from the optical signals received from corresponding optical connectors via openings 410 and lens device 418. That is, the electrical signals can be modified with other electronics and provided to internal circuitry of device 400 (e.g., control circuitry 330, as shown in FIG. 3) via an electrical conductor 422 (e.g., a wire or pins). For example, a photodiode IC and EE components (not shown, but can be part of photodiode 420) can receive the electrical signals and modify them to conform to specifications of electronic device 400.

In one embodiment, the lens of lens device 418 can have a rounded, convex shape to provide some focusing of the light from openings 410 toward its lens so that the light does not escape. In another embodiment, lens device 418 can include a receiving lens and collector formed from a single piece of material (e.g. an integral piece of glass). In yet another embodiment, the receiving lens can be a separate piece from the collector. For example, the receiving lens could be made of sapphire, glass, clear ceramics, or harder material to prevent scratching, whereas the collector could be made of plastic.

Although device 400 is shown and described as including openings 410 that have a constant diameter from an outer surface of housing wall 402a to an inner surface of housing wall 402a, embodiments of the present invention can include openings 410 that are wider at the outer surface of housing wall 402a and narrower at the inner surface of housing wall 402a. For example, instead of the cylindrical cavity of openings 410, as shown in FIG. 4B, openings 410 could include a cavity that looks similar to a cone or even a rectangular prism where openings 410 are rectangular. In addition, openings 410 could include individual openings that have differently shaped cavities. For example, some of the cavities of these individual openings could be shaped like a pyramid, while others can be shaped like a cylinder. To form these cavities, openings 410, which extend through housing wall 402a, can be laser cut, machined, or formed when housing 402 is formed (e.g., by molding or otherwise). The walls of housing 402, e.g., housing wall 402a can be about 0.1 mm thick (e.g., 0.3 mm thick or 0.4 mm thick) or other suitable thicknesses can be thinner at the optical connector interface region, as shown in FIG. 4B.

Figure 5A:
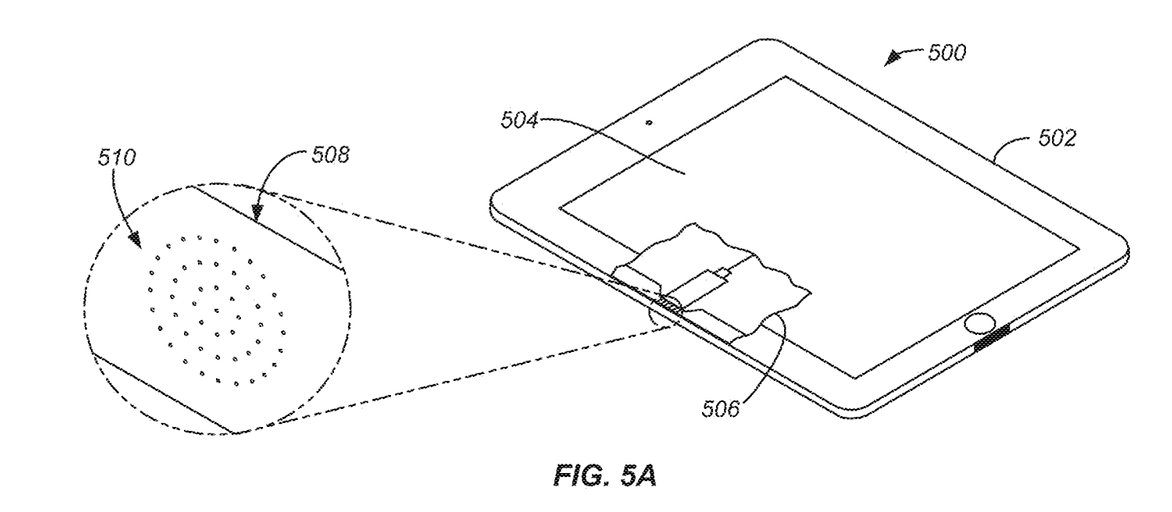
FIG. 5A is a perspective view of an electronic device with a housing and a display partially cut away to reveal a simplified, partial section view of a female optical connector, according to an embodiment of the present invention.
Figure 5B:
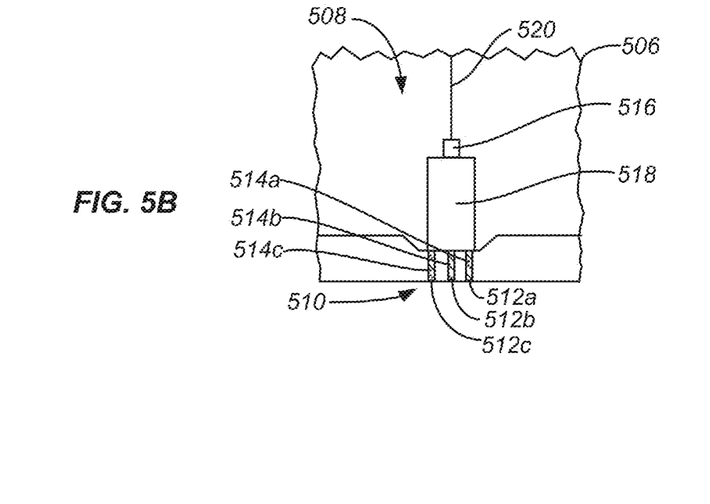
FIG. 5B is an enlarged view of the simplified, partial section view of FIG. 5A.

FIG. 5A is a perspective view of an electronic device 500 with a housing 502 and a display 504 partially cut away to reveal a simplified, partial section view 506 of a female optical connector 508, according to an embodiment of the present invention. FIG. 5B is an enlarged view of the simplified, partial section view 506 of female optical connector 508 of FIG. 5A. Note that the elements of FIGS. 5A-5B are not drawn to any particular scale or even the same scale. Male optical connector 508 can be similar to optical connector 408 (shown in FIGS. 4A and 4B), except that optical connector 408 is male optical connector instead of female connector. Accordingly, the description above related to common features in device 400 (shown in FIGS. 4A and 4B) and optical connector 408 (shown in FIGS. 4A and 4B) and variations thereof can also be applied to device 500 and male optical connector 508 and thus are not repeated here in their entirety in the interest of brevity.

As shown in section view 506 at FIG. 5B, openings 510 form an optical channel for carrying optical signals and include individual openings 512a, 512b, 512c (note: not all individual openings of openings 510 are shown in FIG. 5B) for receiving optical signals from a corresponding optical connector (e.g., optical connector 408, as shown in FIGS. 4A and 4B). Again, the description of openings 412a, 412b, 412c and variations thereof can apply to openings 512a, 512b, 512c and are not repeated here in their entirety in the interest of brevity. Some or all of openings 510 can also be partially or wholly filled, e.g., using insert molding, with passive optical components for carrying optical signals. For example, as shown in FIG. 5B, openings 512a, 512b, 512c can be filled with passive optical components 514a, 514b, 514c, respectively, which can be made from, e.g., optical fiber such as glass or plastic fiber. Alternatively, a thin film or a coating may be used to cover openings 510 to simply prevent the ingress of debris. However, in some embodiments, the individual openings of openings 510 are not filled with any kind of passive optical component.

Male optical connector 508 can include a laser device 516 (e.g., a vertical cavity surface emitting laser (VACSEL)) or another optical transmitter to transmit light (e.g., infrared light) through transmission lens 518. For example, laser device 516 can transmit light when it receives electrical signals from internal circuitry of device 500 (e.g., control circuitry 330, as shown in FIG. 3) via electrical conductors 520. Optical connector 508 can also include laser IC and EE components (not shown) that can convert electrical signals received via electrical conductors 520 to signals that drive an optical transmitter (e.g. laser device 516). This light can be used to send optical signals to transmission lens 518, and transmission lens 518 can then provide the optical signals to a corresponding optical connector via openings 510. Transmission lens 518 can include a barrel shaped tube with a lens (e.g. a curved lens), which can provide light in a generally parallel direction. The back of transmission lens 518 can be in contact with laser device 516. Alternatively, an air gap can exist between laser device 516 and transmission lens 518.

As mentioned above, optical connectors according to the present invention, such as optical connector 205 (shown in FIG. 2A), can employ a number of methods to determine when to send and/or receive optical signals or to attempt to establish a communication link with another device and when to remain in a powered off state. Examples of such methods are further discussed with reference to the following figure.

Figure 6:
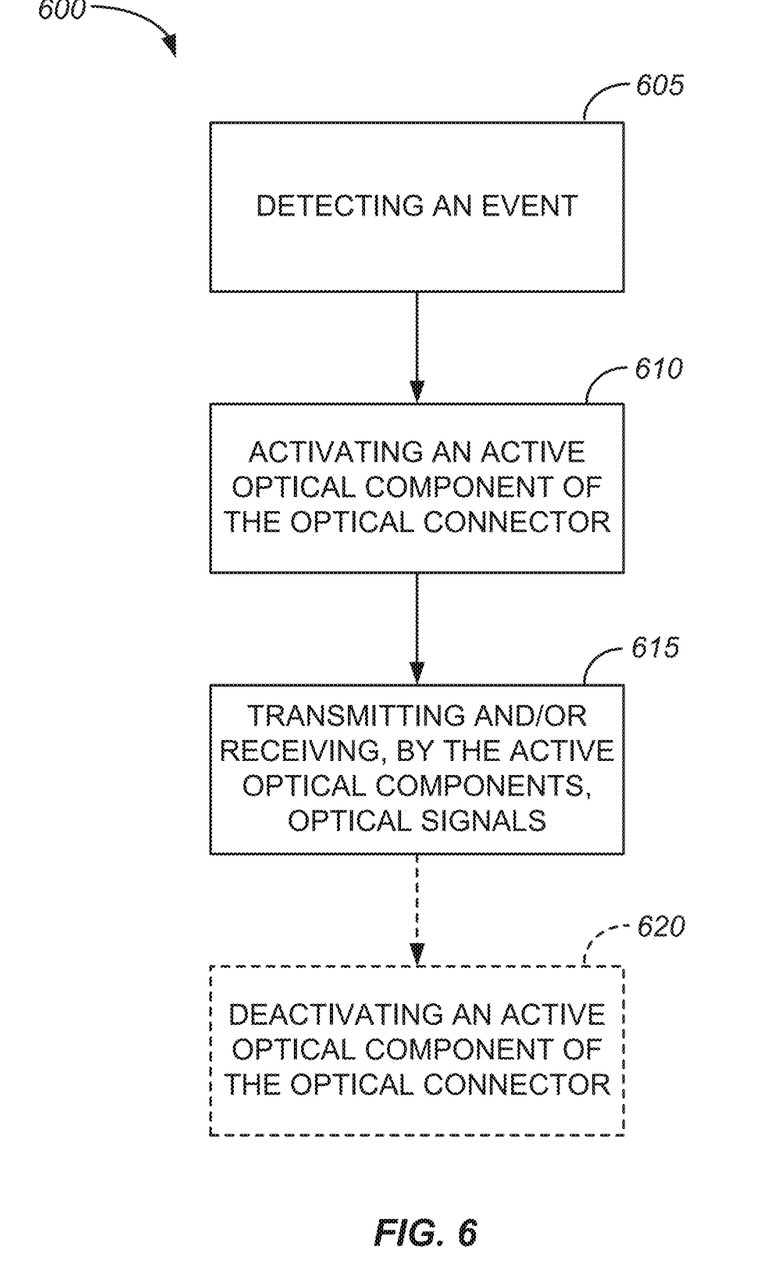
FIG. 6 illustrates steps of a method for initiating optical communication between a connector of an electronic device and a corresponding connector of another electronic device, according to an embodiment of the present invention.

FIG. 6 illustrates steps of a method 600 for initiating optical communication between a connector of an electronic device and a corresponding connector of another electronic device, according to an embodiment of the present invention. Method 600 can conserve battery power for electronic devices according to the present invention.

At a step 605, an electronic device (e.g., electronic device 200, as shown in FIG. 2A) or an optical connector (e.g., optical connector 205, as shown in FIG. 2A) can detect an event. For example, an electronic device (e.g., electronic device 200, as shown in FIG. 2A) can detect a mating event such as a corresponding connector (e.g., connector 235, as shown in FIG. 2B) being physically coupled or brought within proximity to an electronic device's optical connector (e.g., optical connector 205, as shown in FIG. 2B). The electronic device can detect this mating event using one or more sensors (e.g., the sensors discussed and referenced above with reference to FIGS. 2A-2C).

As another example, an electronic device (e.g., electronic device 200, as shown in FIG. 2A) can detect a wake event such as when the device wakes from a sleep state in response to, e.g., a wake input (e.g., an input received at touch screen display 225, which operates as both an input and an output component) received at the device. In yet another example, an electronic device (e.g., electronic device 200, as shown in FIG. 2A) can detect a specific input (e.g., received at touch screen display 225) corresponding to a command to activate or provide power to its optical connector (e.g., optical connector 205, as shown in FIG. 2B).

Alternatively, instead of detecting an external event such as mating, wake or input events, an electronic device can activate or provide power to its optical connector in response to an event occurring internal to the electronic device. For example, an electronic device (e.g., electronic device 200, as shown in FIG. 2A) can detect a determination event such as when the device determines that a period of time (e.g., 30 seconds, 5 minutes, or 2 hours) has passed since the device's optical connector (e.g., optical connector 205, as shown in FIG. 2B) has been powered on or that a specific preprogramed command (e.g., an alarm clock notification command or a gyroscope-based movement determination response command) has been executed on the device.

At a step 610, an active optical component (e.g., active optical component 320, as shown in FIG. 3) can be activated when an event (e.g., the event(s) detected at step 605) is detected by an electronic device (e.g., electronic device 300) or by an optical connector (e.g., connector 305, as shown in FIG. 3) at step 605. This activation can include providing power (e.g., by the electronic device) to the optical connector when the optical connector is not currently powered on; changing the operational state (e.g., by the electronic device or the optical connector) of the optical connector to higher power consumption state; or simply directing power (e.g., by the optical connector) already being provided to the optical connector to its active optical component.

At a step 615, an active optical component (e.g., active optical component 320, as shown in FIG. 3) can transmit and/or receive optical signals. These optical signals can be used to communicate with a corresponding connector (e.g., optical connector 315, as shown in FIG. 3) that is proximate or physically coupled to a device's optical connector. This active optical component can be an optical transceiver (e.g., as discussed above with reference to active optical component 320, as shown in FIG. 3), a photodiode (e.g., photodiode 420, as shown in FIG. 4B) or a laser (e.g., laser device 516, as shown in FIG. 5B). This optical connector can include perforations or openings (e.g., openings 220, as shown in FIG. 2A; openings 410, as shown in FIGS. 4A-4B; and openings 510, as shown in FIGS. 5A-5B) sized such that they are not visible or not easily visible with the naked human eye and so small that no single opening of these openings is large enough for carrying optical signals that can be used to communicate with corresponding optical connectors.

Optionally, at a step 620, the active optical component that was activated at step 615 can be deactivated. The electronic device of the optical connector can deactivate this active optical component when, e.g., the electronic device returns to a sleep mode, a period of time has passed since last communicating with a corresponding connector, sensors detect that a corresponding connector has been decoupled, a specific input corresponding to a command to deactivate the active optical component is received, or simply when the electronic device powers off.

Also, while a number of specific embodiments were disclosed with specific features, a person of skill in the art will recognize instances where the features of a number of different embodiments can be combined with the features of another embodiment. In addition, some specific embodiments of the invention set forth above were illustrated with portable electronic devices. A person of skill in the art will readily appreciate that embodiments of the present invention can be implemented with desktop computers and other non-portable electronic devices. In addition, optical connectors discussed herein could also include power contacts (e.g., flush electrical contacts disposed located at the connector's mating region) or inductive charging elements. Also, those skilled in the art will recognize, or be able to ascertain using no more than routine experimentation, many equivalents to the specific embodiments of the inventions described herein. Such equivalents are intended to be encompassed by the following claims.

What is claimed is:

1. An electronic device that supports optical communication, the electronic device comprising:
a connector having a mating region that includes a plurality of openings, the mating region forming a portion of an exterior surface of the electronic device, the connector comprising:
an active optical component for at least one of transmitting or receiving optical signals, the active optical component positioned adjacent to the plurality of openings, wherein each of the plurality of openings is sized such that an amount of light passing through any single opening of the plurality of openings is insufficient for communicating with a corresponding connector using an optical signal; and
a lens positioned between the plurality of openings and the active optical component.

2. The electronic device of claim 1, wherein the active optical component includes a photodiode that converts electromagnetic radiation to electrical signals.

3. The electronic device of claim 2, further comprising a collector that extends between the active optical component and the lens, the collector configured to collect light and provide the light to the photodiode.

4. The electronic device of claim 1, wherein the active optical component includes a laser device that converts electrical signals to electromagnetic radiation.

5. The electronic device of claim 4, wherein the lens extends between the active optical component and the plurality of openings, wherein the plurality of openings are configured to carry optical signals transmitted by the active optical component.

6. The electronic device of claim 4, wherein the laser device is an infrared laser device.

7. The electronic device of claim 1, wherein the optical signals communicate data corresponding to at least one of state change information or a keystroke input.

8. The electronic device of claim 1, wherein the plurality of openings include between about 10 openings and about 80 openings.

9. The electronic device of claim 1, wherein a diameter of each of the plurality of openings is between about 0.01 mm and about 0.4 mm.

10. The electronic device of claim 1, wherein the connector further includes a passive optical component disposed within one or more of the plurality of openings, the passive optical component configured to carry optical signals transmitted by the active optical connector.

11. An electronic device that supports optical communication, the electronic device comprising:
a housing having a mating region that includes an optical channel having a plurality of openings extending between exterior and interior surfaces of the housing;
a processor positioned within the housing; and
an optical connector positioned adjacent to the mating region, the optical connector including an active optical component operatively coupled to the processor and a lens positioned between the optical channel and the active optical component, wherein the optical component is configured to transmit and receive optical signals between the electronic device and a corresponding optical connector associated with a second device through the optical channel, and wherein each individual opening in the plurality of openings is too small to allow an optical signal to be communicated over the optical channel through the individual opening.

12. The electronic device of claim 11, wherein the active optical component is a transceiver.

13. The electronic device of claim 11, wherein the optical connector further includes a holding mechanism for mechanically retaining the corresponding optical connector in a mated position with the optical connector.

14. The electronic device of claim 11, wherein the optical connector further includes a magnetic element having poles positioned to generate a magnetic field that attracts the corresponding optical connector.

15. The electronic device of claim 11, wherein the electronic device is a host device, an accessory or a cable assembly.

16. A method of initiating optical communication between an optical connector of an electronic device and a corresponding connector of another electronic device, the method comprising:
activating an active optical component of the optical connector when an event is detected by the electronic device; and
at least one of transmitting or receiving optical signals using the active optical component, wherein the active optical component is positioned adjacent to a plurality of openings of the optical connector, wherein each of the plurality of openings is sized such that an amount of light passing through any single opening of the plurality of openings is insufficient for communicating with the corresponding connector using an optical signal.

17. The method of claim 16, wherein the detected event is the optical connector being mated with the corresponding connector, wherein a sensor detects the mating.

18. The method of claim 16, wherein the detected event is the electronic device waking from a sleep mode, wherein the active optical component remains activated until the electronic device returns to the sleep mode.

19. The method of claim 16, wherein the detected event is an input received at the electronic device.

20. The method of claim 16, wherein the detected event is a determination made by the electronic device that a period of time has passed since the electronic device powered on.

* * * * *